United States Patent
Fujisaki et al.

(10) Patent No.: US 8,523,368 B2
(45) Date of Patent: Sep. 3, 2013

(54) PROJECTION DISPLAY APPARATUS HAVING STORED INFORMATION FOR AUTHENTICATING LIGHT SOURCE

(75) Inventors: Takeshi Fujisaki, Amagasaki (JP); Hiromitsu Okuno, Osaka (JP)

(73) Assignee: SANYO Electric Co., Ltd., Moriguchi-Shi, Osaka (JP)

( * ) Notice: Subject to any disclaimer, the term of this patent is extended or adjusted under 35 U.S.C. 154(b) by 367 days.

(21) Appl. No.: 12/499,007

(22) Filed: Jul. 7, 2009

(65) Prior Publication Data

US 2010/0007856 A1 Jan. 14, 2010

(30) Foreign Application Priority Data

Jul. 8, 2008 (JP) ................................ 2008-178303

(51) Int. Cl.
*G03B 21/00* (2006.01)
*G03B 21/14* (2006.01)
*G03B 21/20* (2006.01)
*G03B 21/22* (2006.01)

(52) U.S. Cl.
USPC .............................. 353/85; 353/119; 353/122

(58) Field of Classification Search
USPC .................... 353/52, 54, 57, 85, 87, 119, 122
See application file for complete search history.

(56) References Cited

U.S. PATENT DOCUMENTS

| | | | |
|---|---|---|---|
| 5,855,488 A * | 1/1999 | Heintz et al. | 439/310 |
| 6,268,799 B1 | 7/2001 | Miyashita et al. | |
| 6,345,896 B1 * | 2/2002 | Kurosawa | 353/119 |
| 6,755,541 B2 * | 6/2004 | Nakano et al. | 353/119 |
| 7,011,417 B2 * | 3/2006 | Kyoto et al. | 353/119 |
| 2003/0142970 A1 | 7/2003 | Nishida et al. | |
| 2003/0214638 A1 * | 11/2003 | Okada | 353/87 |
| 2004/0052515 A1 | 3/2004 | Nishida et al. | |
| 2004/0080715 A1 * | 4/2004 | Miyashita et al. | 353/30 |
| 2005/0024219 A1 * | 2/2005 | Childers | 340/641 |
| 2006/0066816 A1 | 3/2006 | Horiguchi et al. | |
| 2006/0087622 A1 * | 4/2006 | Brown | 353/57 |
| 2008/0218701 A1 * | 9/2008 | Shirasu et al. | 353/85 |
| 2009/0058321 A1 * | 3/2009 | Furuse | 315/294 |
| 2010/0110392 A1 * | 5/2010 | Kaise et al. | 353/52 |

FOREIGN PATENT DOCUMENTS

| | | |
|---|---|---|
| CN | 1437118 | 8/2003 |
| CN | 1570755 | 1/2005 |
| CN | 1755514 | 4/2006 |
| EP | 0947883 | 10/1999 |

(Continued)

OTHER PUBLICATIONS

Corresponding application Office Action, Chinese Application No. 200910147369.4; English translation included.

(Continued)

*Primary Examiner* — Tony Ko
*Assistant Examiner* — Jori S Reilly-Diakun
(74) *Attorney, Agent, or Firm* — NDQ&M Watchstone LLP

(57) ABSTRACT

A projection image display apparatus including a detachably attachable light source unit includes: a storage means provided to the light source unit and having previously stored therein information that the light source unit is a genuine product; a determination means making a comparison with the information in the storage means to determine whether the light source unit is the genuine product; and a light source control means controlling an output of the light source unit in accordance with a result from the determination means.

2 Claims, 8 Drawing Sheets

(56) References Cited

FOREIGN PATENT DOCUMENTS

| | | |
|---|---|---|
| EP | 1363451 | 11/2003 |
| GB | 2438909 | 12/2007 |
| JP | 08220637 | 8/1996 |
| JP | 2000-131758 A | 5/2000 |
| JP | 2000-131759 A | 5/2000 |
| JP | 2002-341442 A | 11/2002 |
| JP | 2003234982 | 8/2003 |
| JP | 2007073707 | 3/2007 |
| JP | 2007-286550 A | 11/2007 |
| JP | 2008-185712 A | 8/2008 |
| WO | 2007045318 | 4/2007 |

OTHER PUBLICATIONS

European Partial Search Report from corresponding case, dated Mar. 31, 2010.
European Search Report from corresponding European Application 09008880.8; dated Jun. 7, 2010.
Japanese Office Action issued Sep. 18, 2012 in corresponding Japanese application No. 2008-178303.
English Abstract for JP 2008-185712 A, published Aug. 14, 2008.
English Abstract for JP 2007-286550 A, published Nov. 1, 2007.
English Abstract for JP 2002-341442 A, published Nov. 27, 2002.

* cited by examiner

PROJECTION DISPLAY APPARATUS HAVING STORED INFORMATION FOR AUTHENTICATING LIGHT SOURCE

BACKGROUND OF THE INVENTION

1. Field of the Invention

The present invention relates to techniques employed to control a projector in a projection image display apparatus when a light source unit or a filter of genuine/non-genuine products are used therein.

2. Description of the Background Art

Projectors configured with a projector light source comprising a lamp for a light source and a reflection umbrella surrounding the lamp, with the lamp exchangeable with a lamp of a different type and combined with an initially used reflection umbrella to allow the lamps to be exchanged, are known from Japanese Patent Laying-open Nos. 2000-131758 and 2000-131759.

In doing so, information corresponding to the type of the exchanged lamp can be obtained and in accordance therewith a drive voltage and a cooling operation can be controlled in accordance with the lamp's different specification.

Furthermore, this configuration also allows information of an illumination unit corresponding to the lamp to be obtained, and a lamp having any rating can be driven.

As disclosed in prior art, the techniques for control described in the above documents are effective for a specification of an identified component and a component of a genuine product of a manufacturer that satisfies safety for cooling. Currently, however, components of non-genuine products that manufacturers are not involved in are also in the market.

Accordingly, there is a possibility that such non-genuine light sources or non-genuine filters cannot be verified by manufacturers sufficiently and there is a possibility that users who use non genuine light sources or non genuine filters may have unexpected disbenefits.

SUMMARY OF THE INVENTION

The present invention contemplates a projection image display apparatus including a detachably attachable light source or filter, that does not disbenefit users who use non genuine light sources or non genuine filters in the apparatus.

The present invention in one aspect provides a projection image display apparatus comprising: a light source unit configured to be detachably attachable to a main body of the apparatus; a storage unit provided to the light source unit for previously storing therein information that the light source unit is a genuine product; a determination unit communicatively connected to the storage unit in response to the light source unit being attached to the main body of the apparatus for communicating with the storage unit using the information to make a decision on whether the light source unit is the genuine product; and a light source control unit operative in accordance with the decision made by the determination unit to control an output of the light source unit.

The present invention in another aspect provides a projection image display apparatus comprising: a light source unit configured to be detachably attachable to a main body of the apparatus; a cooling unit for cooling the light source unit; a storage unit provided to the light source unit for previously storing therein information that the light source unit is a genuine product; a determination unit communicatively connected to the storage unit in response to the light source unit being attached to the main body of the apparatus for communicating with the storage unit using the information to make a decision on whether the light source unit is the genuine product; and a cooling control unit operative in accordance with the decision made by the determination unit to control an output of the cooling unit.

The present invention in still another aspect provides a projection image display apparatus comprising: a light source unit configured to be detachably attachable to a main body of the apparatus; an optical modulation unit modulating light received from the light source unit; a projection lens receiving light from the optical modulation unit and magnifying and projecting the light on a screen; a storage unit provided to the light source unit for previously storing therein information that the light source unit is a genuine product; a determination unit communicatively connected to the storage unit in response to the light source unit being attached to the main body of the apparatus for communicating with the storage unit using the information to make a decision on whether the light source unit is the genuine product; and an OSD device for displaying on a screen the decision made by the determination unit.

The present invention in still another aspect provides a projection image display apparatus comprising: a light source unit; a filter disposed on a coolant channel passing a coolant therethrough for cooing the light source unit, and configured to be detachably attachable to a main body of the apparatus; an optical modulation unit modulating light received from the light source unit; a projection lens receiving light from the optical modulation unit and magnifying and projecting the light on a screen; a storage unit provided to the filter for previously storing therein information that the filter is a genuine product; a determination unit communicatively connected to the storage unit in response to the filter being attached to the main body of the apparatus for communicating with the storage unit using the information to make a decision on whether the filter is the genuine product; and an OSD device for displaying on a screen the decision made by the determination unit.

Preferably, when the determination unit determines that the light source unit is a non genuine product the light source control unit decreases the output of the light source unit to be smaller than in a normal operation.

Preferably, when the determination unit determines that the light source unit is a non genuine product the cooling control unit increases the output of the cooling unit to be larger than in a normal operation.

Preferably, when the determination unit determines that the light source unit is a non genuine product the OSD device operates to display on the screen that the light source unit is the non genuine product.

Preferably, when the determination unit determines that the filter is a non genuine product the OSD device operates to display on the screen that the filter is the non genuine product.

The present invention can thus provide a projection image display apparatus including a detachably attachable light source or filter, that does not disbenefit users who use non genuine light sources or non genuine filters in the apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Reference will now be made to FIGS. 1-10 to describe a projection image display apparatus according to each embodiment of the present invention.

It should be noted that the figures are schematic and specific geometries, dimensions, and ratios are different. Furthermore, some specific geometries, dimensions, and ratios are also different between the figures.

Furthermore, in the figures, identical or similar components are identically denoted and will not be described repeatedly.

First Embodiment

The present invention in a first embodiment provides a projection image display apparatus, as will now be described hereinafter with reference to FIGS. 1-6.

Figure 1:
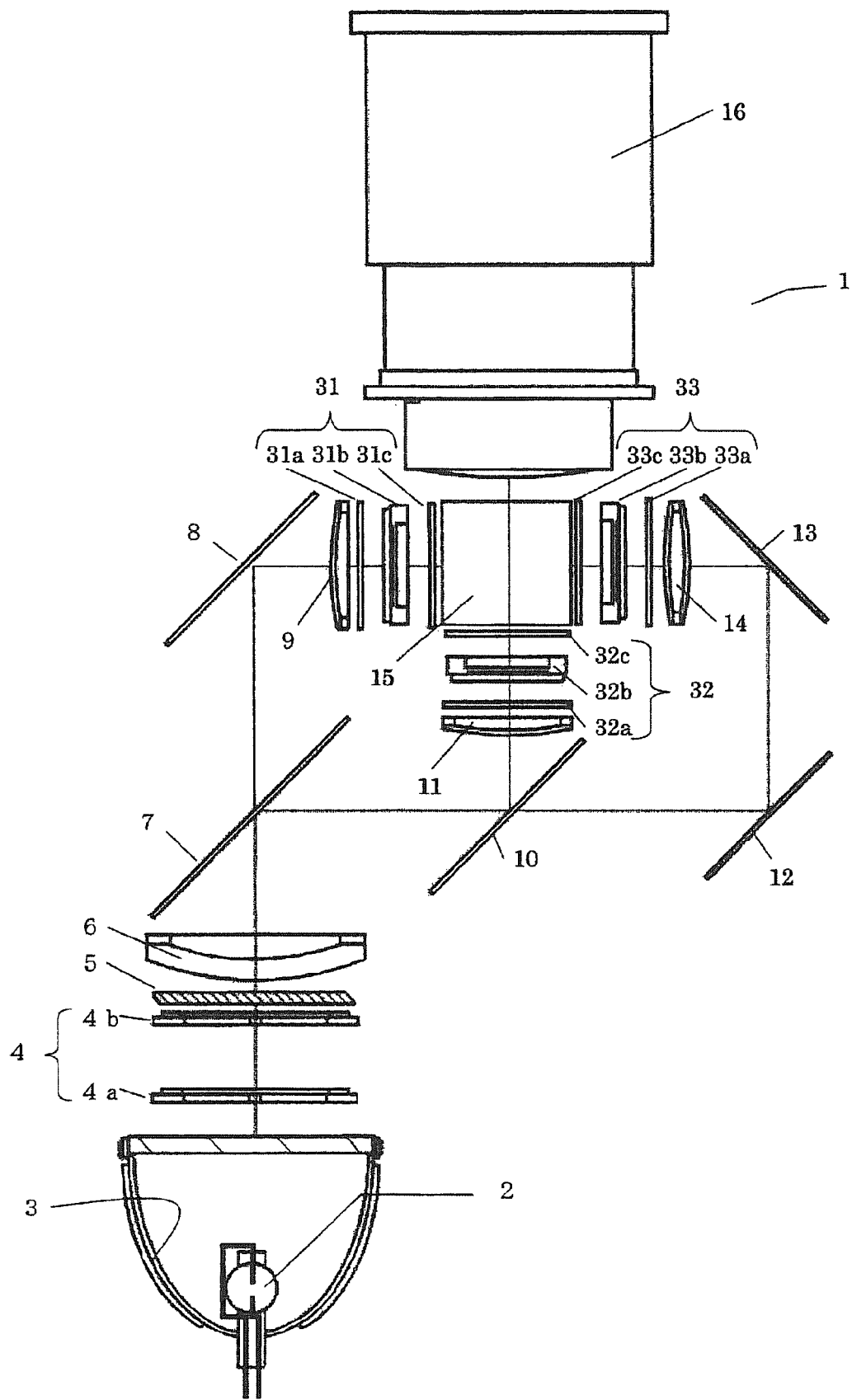
FIG. 1 shows a configuration of an optical engine of a projection image display apparatus according to a first embodiment.

FIG. 1 shows a 3-plate liquid crystal optical engine 1 in the first embodiment. In a light source 2 a light emitting unit is a super high pressure mercury lamp, a metal halide lamp, a xenon lamp or the like, and emits light which is in turn collimated by a parabola reflector 3 and thus emanates therefrom, and is guided to an integrator lens 4.

Integrator lens 4 is configured of a pair of lenses (fly eye lens) 4a and 4b. Each lens portion is adapted to guide the light that emanates from light source 2 to an entire surface of a liquid crystal light valve described hereinafter, to average partial, varying intensity present in light source 2 to reduce a difference in quantity of light between a center of a screen and a peripheral portion of the screen. Integrator lens 4 passes light, which in turn passes through a polarization conversion device 5 and a condenser lens 6 and is then guided to a first dichroic mirror 7.

Polarization conversion device 5 is configured of a polarizing beam splitter array (hereinafter referred to as "PBS array"). The PBS array includes a polarization separating film and a phase difference plate (a ½λ plate). The PBS array's each polarization separating film receives light from integrator lens 4 and, of the received light, for example transmits p polarized light and redirects s polarized light to have an optical path changed by 90°. The s polarized light having its optical path changed is reflected by an adjacent polarization separating film and thus emanates. In contrast, the p polarized light transmitted through the polarization separating film is converted to s polarized light by the phase difference plate provided at a front side of the p polarized light (i.e., a side at which the light emanates), and thus emanates. In other words, in this case, almost all of light is converted to s polarized light.

First dichroic mirror 7 transmits red color wavelength band light and reflects cyan (green plus blue) wavelength band light. The red color wavelength band light transmitted by first dichroic mirror 7 is reflected by a total reflection mirror 8 and thus has its optical path changed. The red color light reflected by total reflection mirror 8 passes through a lens 9 and is transmitted through a transmission liquid crystal light valve 31 for red color light and thus optically modulated. The cyan wavelength band light reflected by first dichroic mirror 7 is guided to a second dichroic mirror 10.

Second dichroic mirror 10 transmits blue color wavelength band light and reflects green wavelength band light. The green wavelength band light reflected by second dichroic mirror 10 passes through a lens 11 and is guided to a transmission liquid crystal light valve 32 for green color light, and transmitted therethrough and thus optically modulated. The blue wavelength band light transmitted by second dichroic mirror 10 is guided via total reflection mirrors 12 and 13 and a lens 14 to a transmission liquid crystal light valve 33 for blue color light, and transmitted therethrough and thus optically modulated.

Each liquid crystal light valve 31, 32, 33 is an optical modulation unit including incident polarization plates 31a, 32a, 33a, panel units 31b, 32b, 33b formed of a pair of glass substrates (provided with a pixel electrode, an orientation film and the like) and liquid crystal sealed between the glass substrates, and emanating polarization plates 31c, 32c, 33c.

The light modulated through liquid crystal light valves 31, 32, 33 (or the light of each color of an image) is composited by a cross dichroic prism 15 to be colored image light, which is in turn magnified by a projection lens 16 and thus projected, and thus displayed on a screen (not shown).

Figure 2A:
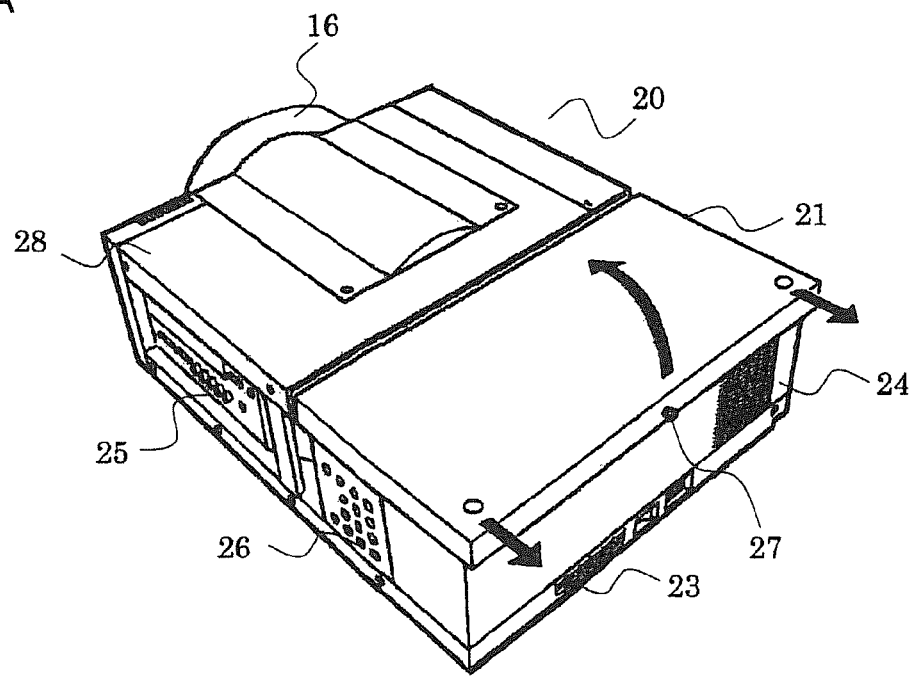
FIGS. 2A and 2B are perspective views of a detachably attachable light source of the projection image display apparatus according to the first embodiment.
Figure 2B:
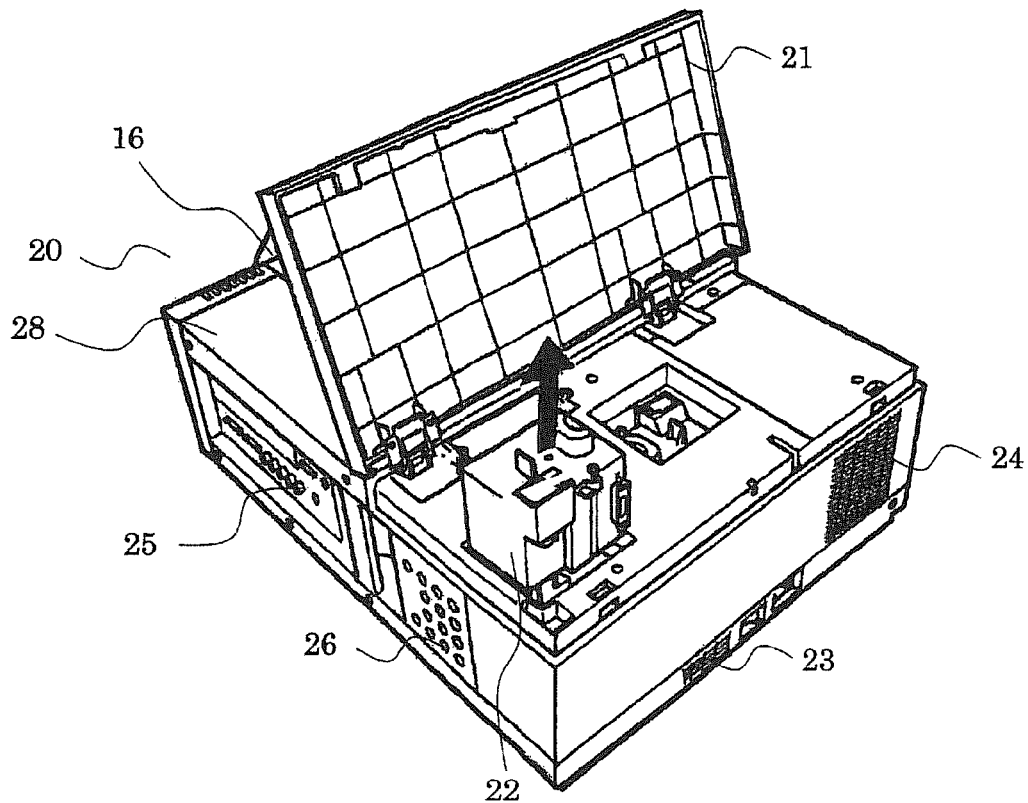

FIGS. 2A and 2B are perspective views of a projection image display apparatus of the present invention in the first embodiment implemented as a projector 20.

Furthermore, FIG. 2A shows projector 20 with a back case 21 drawn out frontward, and FIG. 2B shows projector 20 with back case 21 drawn out frontward and a light source unit 22 therein extracted therefrom.

Projector 20 has a casing 28, which is provided with an optical engine 1, a main board (not shown), a cooling fan 45 (see FIG. 4), ventilation holes 23 and 24, an external equipment connector unit 25, a console panel 26, and the like.

The main board (not shown) is powered on by a user to operate to variously control projector 20, such as an optical modulation function by optical engine 1, executing a specific operation performed by the user, transmitting/receiving and converting a signal received from and output to external equipment connector unit 25.

Cooling fan 45 introduces external air through ventilation holes 23, 24 and the like to cool a heat generating portion of light source 2 or the like, and exhausts externally from projector 20 the air that has cooled the portion.

External equipment connector unit 25 is a unit interfacing with external image equipment and is provided with a variety of connectors to accommodate a variety of specifications.

Back case 21 is a portion of casing 28, and disengaging a screw 27 to open the case allows the case to expose light source unit 22.

Figure 3:
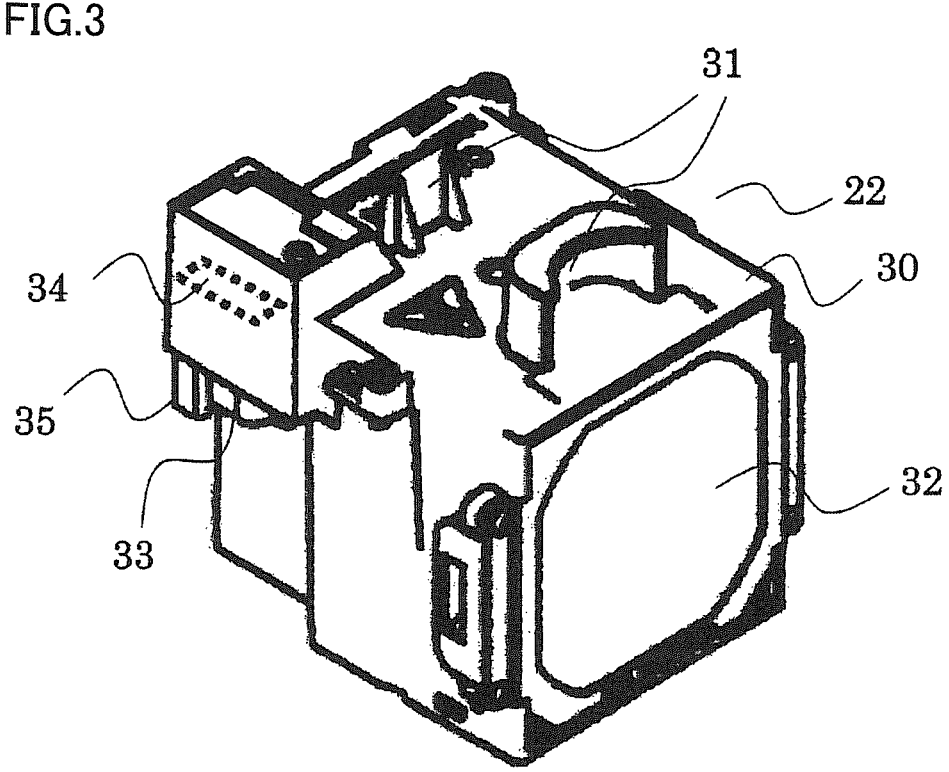
FIG. 3 is a perspective view of a light source according to the first embodiment.

FIG. 3 is a perspective view of light source unit 22 of the present invention in the first embodiment. Light source unit 22 includes a light source 2, a lamp housing 30, a handle 31, protection glass 32, a light source connector 33, an authentication IC 34, and an authentication IC connector 35.

Light source 2 is housed in lamp housing 30 and receives electric power through light source connector 33 to emit light of high intensity. Furthermore, as it is repeatedly used, light source 2 decreases in intensity and thus reaches the end of its life. Accordingly, after it is used for a period of time, light source 2 needs to be exchanged with a new light source.

Lamp housing 30 is formed to position light source 2 and is preferably formed of a heat resistant resin which is capable of enduring the heat of light source 2 increased in temperature and also has low thermal conductivity.

Handle 31 is provided at an upper surface of lamp housing 30 and formed to allow light source unit 22 to be easily held and extracted when back case 21 is opened.

Protection glass 32 prevents a user from touching light source 2 generating heat.

Light source connector 33 electrically connects the main board and light source 2, and light source connector 33 thus connected allows light source 2 to receive power supply.

Authentication IC 34 is connected by authentication IC connector 35, which is disposed in a vicinity of light source connector 33 and configured of a power supply line and two communication lines provided for authentication IC 34, on a IIC bus or the like to a host CPU 40 (see FIG. 4), which is incorporated in the main board, to identify light source unit 22.

Light source connector 33 and authentication IC connector 35 will be connected to a connector that is provided at the main board when a guidance mechanism (not shown) inserts light source unit 22 into projector 20.

Figure 4:
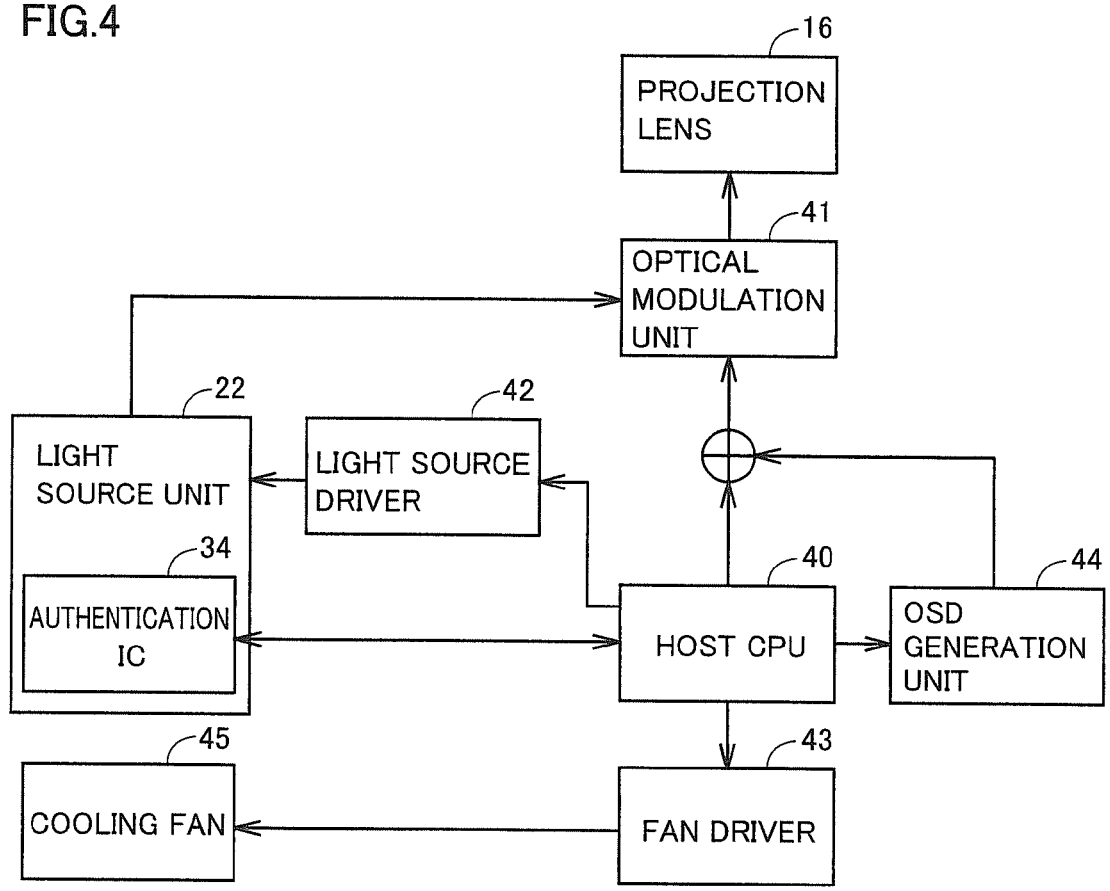
FIG. 4 is a block diagram of a configuration detecting whether a light source is a genuine product according to the first embodiment.

FIG. 4 is a block diagram of a configuration detecting whether a light source is a genuine product according to the first embodiment of the present invention.

When projector 20 is powered on and thus activated, host CPU 40 provided at the main board is simultaneously activated.

Host CPU 40 exerts control to perform a predetermined operation performed when an optical modulation unit 41, a light source driver 42, a fan driver 43, and an OSD generation unit 44 normally operate.

Herein, OSD is an abbreviation of "on-screen display" and is and will also be used hereinafter as a general term for displaying characters, symbols or the like on an image screen to notify a user of information of equipment or the like.

Furthermore, when host CPU 40 is activated, it initially transmits a sequence of random numbers to authentication IC 34. Authentication IC 34 receives the sequence of random numbers, and calculates an exclusive OR of the received sequence of random numbers with an encryption key sequence for encryption and returns it to host CPU 40. Host CPU 40 receives the encrypted, returned signal, and calculates an exclusive OR with the encryption key sequence to reconstruct the returned signal.

The initial sequence of random numbers is compared with the reconstructed sequence of numbers and if they match, host CPU 40 can determine that light source unit 22 currently used is a genuine product, and host CPU 40 issues an instruction to optical modulation unit 41, light source driver 42 and fan driver 43 to normally operate.

In contrast, if the initial sequence of random numbers and the reconstructed sequence of numbers do not match, host CPU 40 can determine that light source unit 22 currently used is a non genuine product, and host CPU 40 issues an instruction to light source driver 42 to cause light source 2 to provide a reduced quantity of light, an instruction to fan driver 43 to cause cooling fan 45 to attain a maximum output level, and an instruction to OSD generation unit 44 to generate an OSD indicating that the light source unit is not a genuine product of a manufacturer. Preferably, host CPU 40 makes a comparison with a specification of a light source unit of a genuine product and issues an instruction to light source driver 42 to provide a quantity of light estimated to be a minimum output level.

Furthermore, authentication IC 34 is preferably for example an IC of a non general purpose product to prevent non genuine products from easily imitating it.

Figure 5:
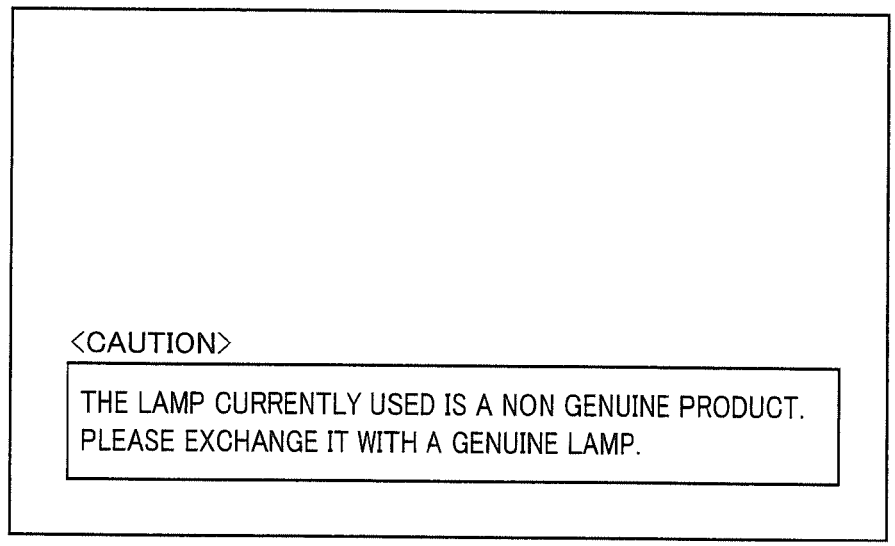
FIG. 5 is an example of an OSD displayed according to the first embodiment.

When it is preferable to issue notification to a user involved in projector 20, OSD generation unit 44 generates and transmits a predetermined phrase, symbol and/or the like to optical modulation unit 41 to display it as an OSD together with an image or alone via projection lens 16 (see FIG. 5).

Figure 6:
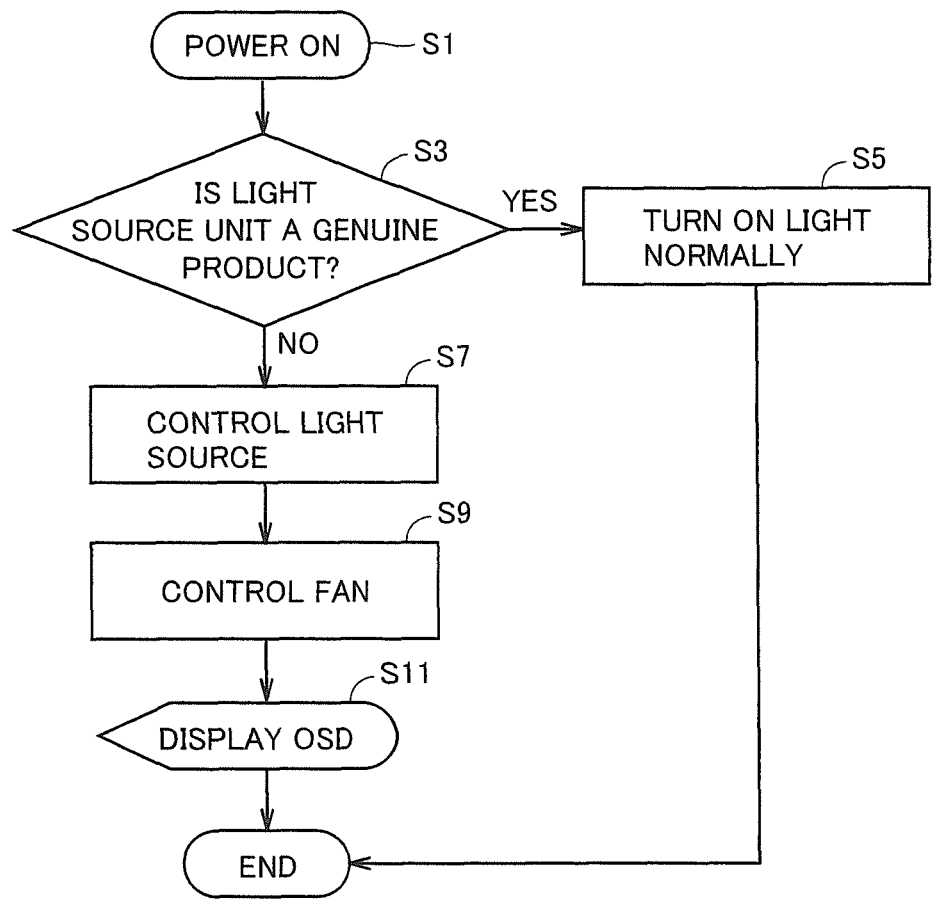
FIG. 6 is a flowchart of an operation according to the first embodiment.

FIG. 6 is a flowchart of an operation according to the first embodiment of the present invention.

Projector 20 is powered on (S1), and in response, light source unit 22 is identified for whether it is a genuine product or a non genuine product (S3).

If light source unit 22 is a genuine product (YES at S3), it is less likely to cause a failure, and each component configuring projector 20 is normally operated (S5). If light source unit 22 is a non genuine product (NO at S3), there is a possibility that the light source may cause an unexpected failure. Accordingly, light source driver 42 decreases the output of light source 2 (S7).

After S7, similarly as described above, fan driver 43 provides adjustment to cause cooling fan 45 to provide a maximum output in preparation for heat generated by light source 2 unexpectedly (S9).

After S9, an OSD is displayed to inform the user that light source unit 22 currently used is a non genuine product (S11).

Note that while in the FIG. 6 flowchart, S7 is followed by S9 followed by S11, these steps may not be performed in a fixed order or may be performed concurrently. Furthermore, only one of S7, S9, S11 may be performed, or two or more of S7, S9, S11 may be combined together and thus performed.

Furthermore, the FIG. 6 flowchart describes that whether light source unit 22 is a genuine product or not is identified when projector 20 is powered on (S1). Alternatively, whether light source unit 22 is a genuine product or not may be identified when light source unit 22 is attached to the main body of the apparatus.

Effect of First Embodiment

Hopefully, a light source that is a genuine product of a manufacturer that satisfies a specification of a component, safety for cooling, and the like should be used. If a light source that is not a manufacturer's genuine product is used, however, the manufacturer cannot provide sufficient verification thereon for safety or exert control in accordance with that lamp. In such a situation, using the non genuine product can invite an unexpected failure, and more specifically, there is a possibility that the light source may abnormally generate heat, which may in turn damage an optical component, a mechanism component and the like other than the light source.

The configuration of the first embodiment can reduce the light source's abnormal heat generation as well as the possibility that the light source's abnormal heat generation invites a secondary damage to damage an optical component, a mechanism component and the like other than the light source.

Furthermore, while it is also possible to prevent using non genuine products, the configuration of the first embodiment allows a user necessitated to temporarily use a non genuine product to use it, and a disbenefit to the user can thus be avoided at least at a lowest level.

Second Embodiment

Hereinafter reference will be made to FIG. 7 to FIG. 10 to describe a projection image display apparatus of the present invention in a second embodiment.

In the first embodiment, whether light source unit 22 is a genuine product or a non genuine product is determined. In the second embodiment, whether a filter 60, rather than light source unit 22, is a genuine product or a non genuine product is determined.

If filter 60 currently used is a genuine product, it satisfies a specification of a component, safety for cooling, and the like, and the normal operation is less likely to cause a problem.

If filter 60 currently used is a non genuine product, then there is one possibility that it has an insufficient ability to introduce sufficient air to cool a heat generating portion. Accordingly, an OSD is displayed to inform that filter 60 is a non genuine product. There is also another possibility that filter 60 has an insufficient ability to collect dust. Accordingly, an OSD is displayed to inform that filter 60 is a non genuine product.

Figure 7A:
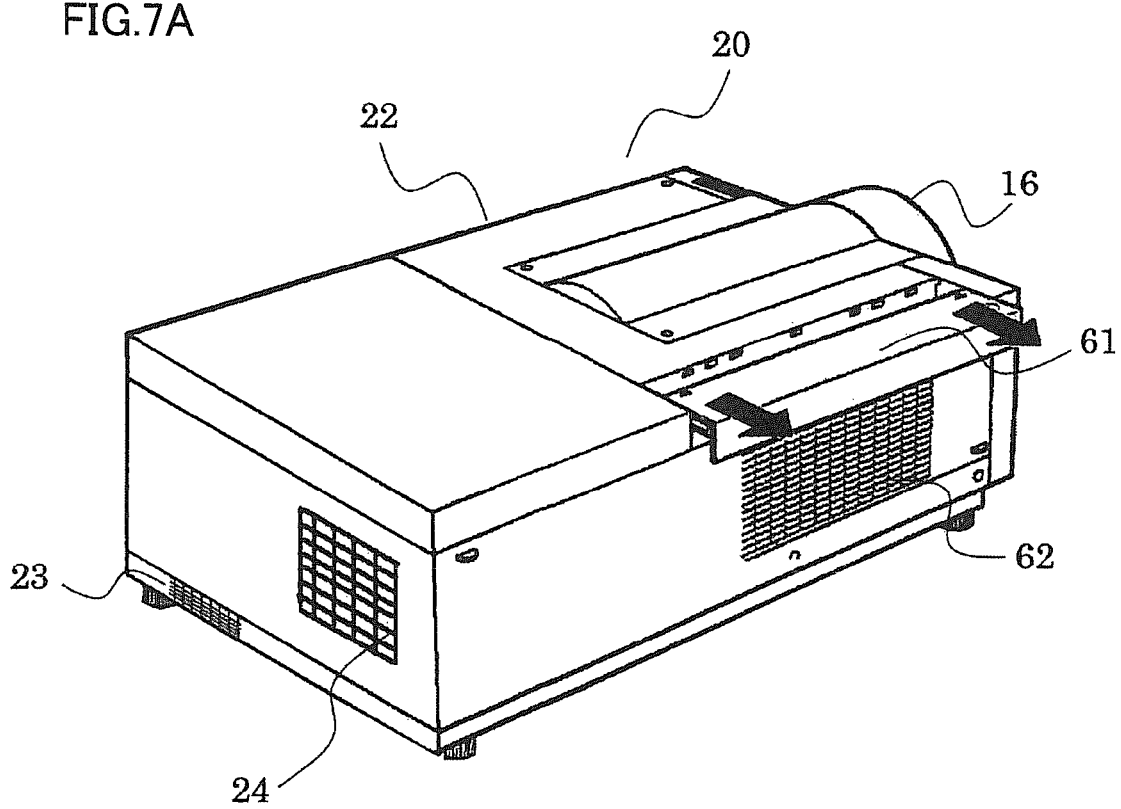
FIGS. 7A and 7B are perspective views of a detachably attachable filter of a projection image display apparatus according to a second embodiment.
Figure 7B:
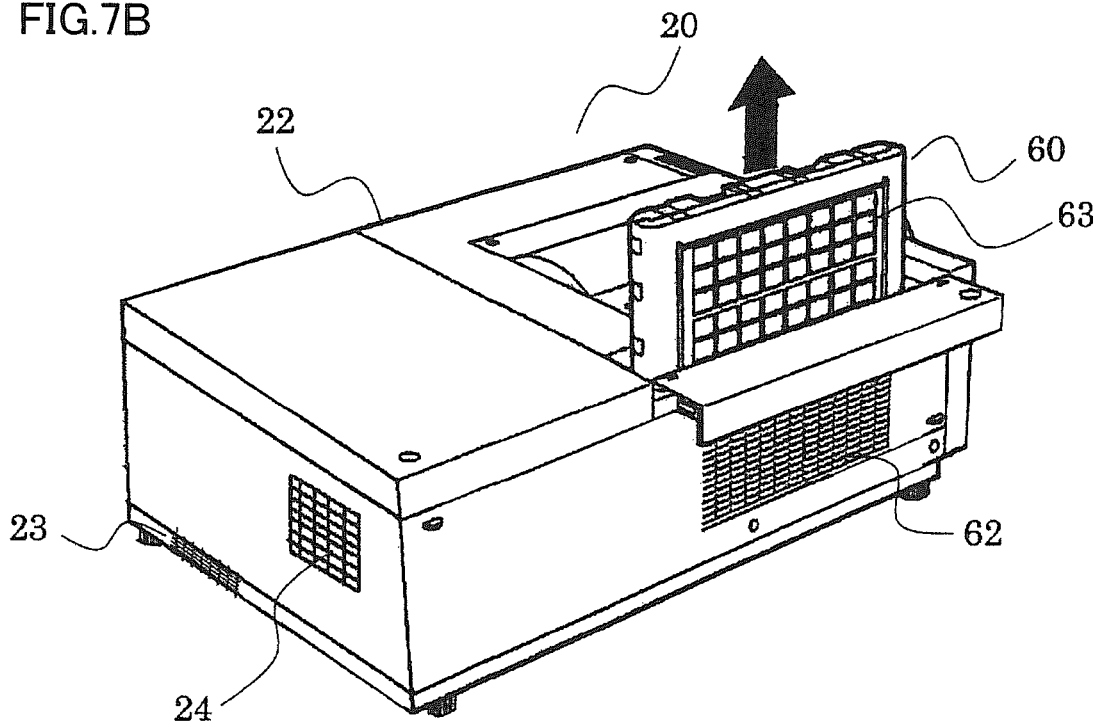

FIGS. 7A and 7B are perspective views of projector 20 implementing the projection image display apparatus according to the second embodiment of the present invention.

Furthermore, FIG. 7A shows projector 20 such that a side cover 61 housing filter 60 is opened, and FIG. 7B shows projector 20 with filter 60 extracted.

Filter 60 is detachably attached on a ventilation path connecting a ventilation hole 62 and a heat generating component, and includes a filter film 63 blocking a flow path. Filter film 63 has a function to prevent fine dust and the like from passing therethrough and pass air therethrough.

Filter 60 can thus remove fine dust included in external air introduced through ventilation hole 62 and prevent dust from adhering to an optical component and the like, and also allows a heat generating component to be cooled.

Furthermore, as filter 60 functions to remove dust and the like, it has dust and the like deposited thereon as it is used for a long period of time. The deposited dust prevents external air from flowing in and thus contributes to a reduced amount of external air introduced. Accordingly in view of protecting a heat generating component it is necessary to exchange filter 60 on a regular basis.

Figure 8:
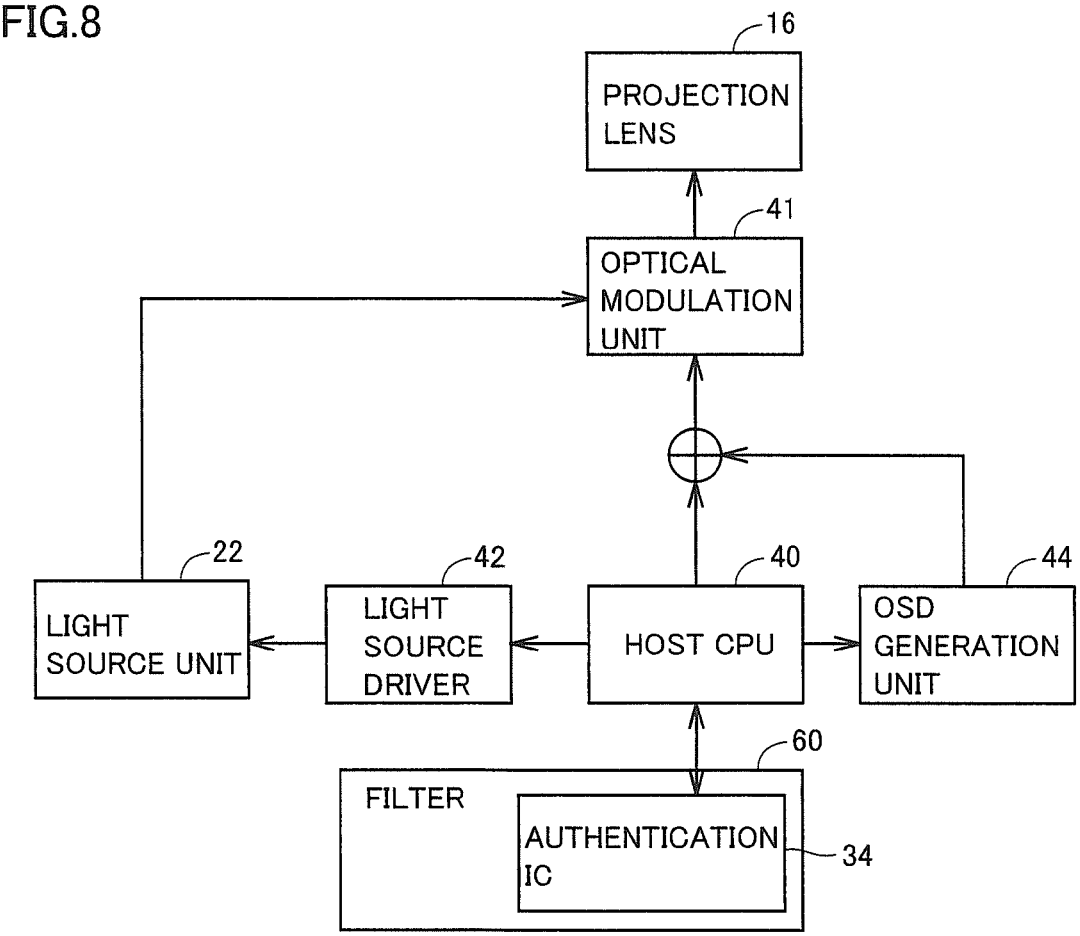
FIG. 8 is a block diagram of a configuration detecting whether a filter is a genuine product according to the second embodiment.

FIG. 8 is a block diagram of a configuration detecting whether a filter is a genuine product according to the second embodiment of the present invention.

In contrast to the first embodiment, filter 60 and authentication IC 34 provided to filter 60 are introduced.

When host CPU 40 is activated, it initially transmits a sequence of random numbers to authentication IC 34. Authentication IC 34 receives the sequence of random numbers, and calculates an exclusive OR of the received sequence of random numbers with an encryption key sequence for encryption and returns it to host CPU 40. Host CPU 40 receives the encrypted, returned signal, and calculates an exclusive OR with the encryption key sequence to reconstruct the returned signal.

The initial sequence of random numbers is compared with the reconstructed sequence of numbers and if they match, host CPU 40 can determine that filter 60 currently used is a genuine product, and host CPU 40 issues an instruction to optical modulation unit 41 and light source driver 42 to normally operate.

Figure 9:
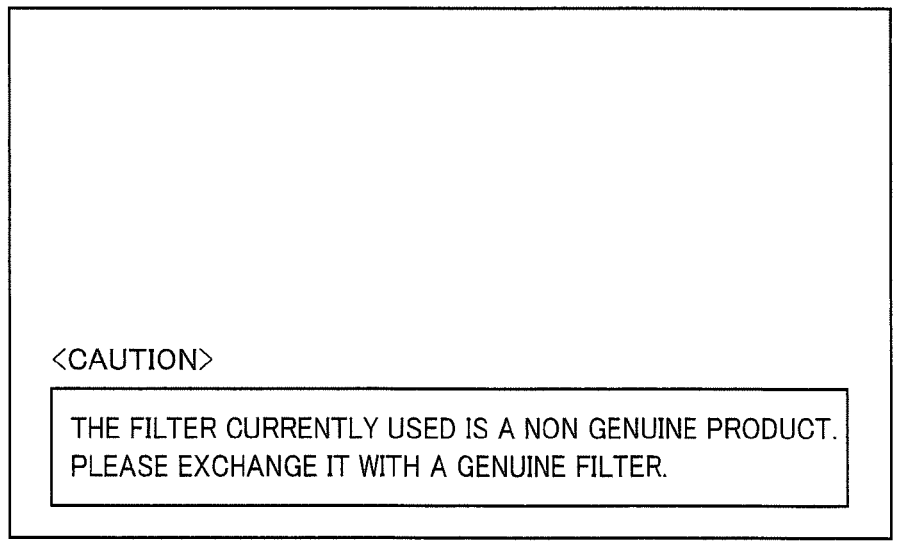
FIG. 9 is an example of an OSD displayed according to the second embodiment.

In contrast, if the initial sequence of random numbers and the reconstructed sequence of numbers do not match, host CPU 40 can determine that filter 60 currently used is a non genuine product, and host CPU 40 issues an instruction to OSD generation unit 44 to generate and display an OSD indicating that the filter is not a genuine product of a manufacturer (see FIG. 9).

Furthermore, authentication IC 34 is preferably for example an IC of a non general purpose product to prevent non genuine products from easily imitating it.

Figure 10:
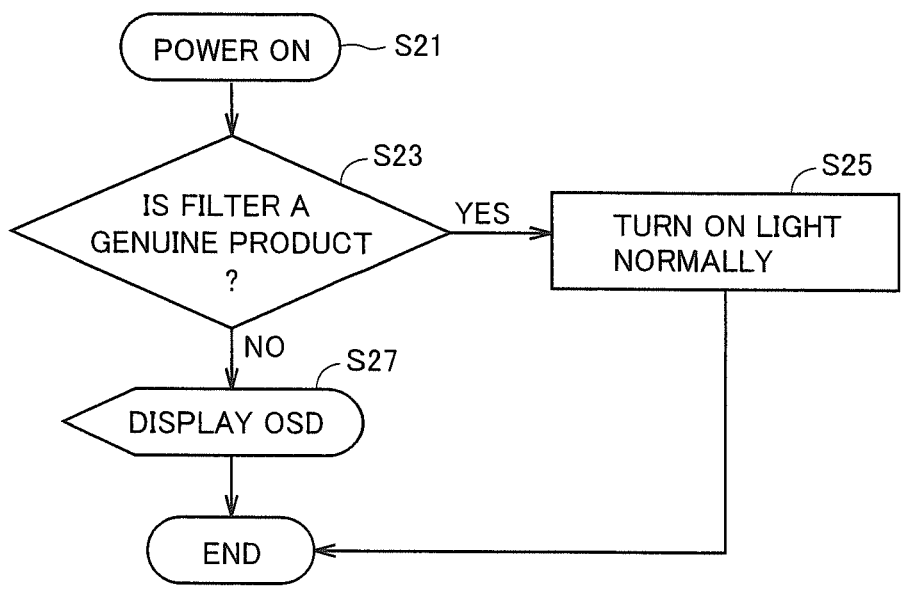
FIG. 10 is a flowchart of an operation according to the second embodiment.

FIG. 10 is a flowchart of an operation according to the second embodiment of the present invention.

Projector 20 is powered on (S21), and in response, filter 60 is identified for whether it is a genuine product or a non genuine product (S23).

If filter 60 is a genuine product (YES at S23), it is less likely to cause a failure, and each component configuring projector 20 is normally operated (S25). If filter 60 is a non genuine product (NO at S23), an OSD is displayed to inform the user that filter 60 currently used is a non genuine product (S27).

Furthermore, the FIG. 10 flowchart describes that whether filter 60 is a genuine product or not is identified when projector 20 is powered on (S21). Alternatively, whether filter 60 is a genuine product or not may be identified when filter 60 is attached to the main body of the apparatus.

Effect of Second Embodiment

Hopefully, a filter that is a genuine product of a manufacturer that satisfies a specification of a component, safety for cooling, and the like should be used. If a filter that is not a manufacturer's genuine product is used, however, it can invite an unexpected failure, and more specifically, there is a possibility that the light source may abnormally generate heat, which may in turn damage an optical component, a mechanism component and the like other than the light source, or the optical component may suffer dust adhering thereto.

The configuration of the second embodiment can inform a user before the light source abnormally generates heat, which may in turn invite a secondary damage to damage an optical component, a mechanism component and the like other than the light source, or the optical component has dust adhering to. The configuration of the second embodiment can thus provide an opportunity to obviate such problems.

Furthermore, while it is also possible to prevent using non genuine products, the configuration of the second embodiment allows a user necessitated to temporarily use a non genuine product to use it, and a disbenefit to the user can thus be avoided at least at a lowest level.

Note that in the first embodiment when light source unit 22 is a non genuine product, light source 2 is controlled to provide an output of a reduced level. Alternatively, light source 2 may completely be turned off. This can also reduce the possibility that the light source may abnormally generate heat, which may in turn invite a secondary damage to damage an optical component, a mechanism component and the like other than the light source.

Furthermore in the first or second embodiment when light source unit 22 or filter 60 is a non genuine product an OSD is displayed to indicate that it is a non genuine product. However, light source connector 33 or a filter connector may insufficiently be connected, and accordingly, an OSD that so indicates may also be provided.

Furthermore, while the first or second embodiment has indicated a projection image display apparatus employing a liquid crystal display panel, the present invention is not limited thereto, and is applicable to a projection image display apparatus including a different type of image light generation system, and can also be applied in the DLP (Digital Light Processing) system, a registered trademark of Texas Instruments Incorporated, and the LCOS (Liquid Crystal on Silicon) system.

It should be noted that in the above description, authentication IC 34 corresponds in the present invention to an embodiment of a storage unit and host CPU 40 corresponds in the present invention to an embodiment of a determination unit or a determination means. Furthermore, light source driver 42 corresponds in the present invention to an embodiment of a light source control unit or a light source control means. Furthermore, cooling fan 45 corresponds in the present invention to an embodiment of a cooling unit and fan driver 43 corresponds in the present invention to an embodiment of a cooling control unit or a cooing control means. Furthermore, OSD generation unit 44 corresponds in the present invention to an embodiment of an OSD device.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A projection image display apparatus comprising:
   a main projector apparatus body;
   a projection element;
   a light source unit configured to be connected to a main board of said main projector apparatus body by a light source connector when a guidance mechanism inserts said light source unit into said main projector apparatus body, wherein the light source unit has a normal operative setting;
   a storage unit, disposed in a vicinity of the light source connector and configured to be connected to the main projector apparatus body by a storage unit connector when the guidance mechanism inserts said light source unit into said main projector apparatus body, for storing therein information to authenticate that said light source unit is genuine, wherein the storage unit is a non-general purpose storage;
   a determination unit communicatively connected to said storage unit in response to said light source unit being attached to said main projector apparatus body of the apparatus for communicating with said storage unit using said information to authenticate said light source unit;
   a light source control unit operative in accordance with the authentication of said light source unit; and
   an OSD device for displaying on a screen a determination of said determination unit;
   wherein
   when said determination unit fails to authenticate said light source unit, said light source control unit decreases said output of said light source unit to below the normal operative setting within the range where a user can use said light source unit and
   when said determination unit fails to authenticate, said OSD device operates to display on said screen that said light source unit is a non-genuine product.

2. The projection image display apparatus according to claim 1, further comprising:
   a cooling unit for cooling said light source unit, the cooling unit having a normal operative setting; and
   a cooling control unit operative in accordance with authentication of said determination unit to control an output said cooling unit,
   wherein when said determination unit fails to authenticate, said cooling control unit increases said output of said cooling unit to be larger than the normal operative setting.

* * * * *